US006443838B1

(12) United States Patent
Jaimet

(10) Patent No.: US 6,443,838 B1
(45) Date of Patent: Sep. 3, 2002

(54) METHOD FOR DEFINING OUTCOMES OF ENSEMBLES OF GAMES USING A SINGLE NUMBER AND WITHOUT REFERENCE TO INDIVIDUAL GAME WINS

(76) Inventor: Scott Jaimet, 16200 SW. Pacific Hwy., Suite 278, Tigard, OR (US) 97224-4053

( * ) Notice: Subject to any disclaimer, the term of this patent is extended or adjusted under 35 U.S.C. 154(b) by 0 days.

(21) Appl. No.: 09/655,989

(22) Filed: Sep. 6, 2000

(51) Int. Cl.[7] .................................................. A63F 13/00
(52) U.S. Cl. ............................. 463/16; 463/29; 700/93
(58) Field of Search ............................. 413/16, 29, 42; 700/91–93; 273/138.1, 138.2, 139

(56) References Cited

U.S. PATENT DOCUMENTS 4,842,275 A 6/1989 Tsatskin
5,374,060 A 12/1994 Goldberg
5,518,239 A 5/1996 Johnston
5,743,525 A 4/1998 Haddad
5,779,242 A 7/1998 Kaufmann
5,839,725 A 11/1998 Conway
5,957,775 A * 9/1999 Cherry ........................ 463/16
6,092,806 A 7/2000 Follis
6,120,376 A * 9/2000 Cherry ........................ 463/16
6,280,324 B1 * 8/2001 Tenenbaum ................. 463/16

FOREIGN PATENT DOCUMENTS

WO WO 99/34887 7/1999

* cited by examiner

*Primary Examiner*—Jessica Harrison
*Assistant Examiner*—John M Hotaling, II
(74) *Attorney, Agent, or Firm*—Weide & Miller, Ltd.

(57) ABSTRACT

The invention is a method of defining the outcome of a plurality of games involving a plurality of participants by a single value. Seed values are assigned to all of the participants. The outcome of each individual event is defined by the seed value assigned to the participant who wins the event. The outcome of all of the events is defined by the sum of the individual seed values of the winning participants of all of the individual events. In one embodiment, the possible single values representing all possible permutations of outcomes are generated. Bettors are permitted to place bets upon particular values. Winners of the betting event are determined by comparing values selected by betters to the actual single value resulting from the outcomes of the games. In one embodiment, the method is applied to a tournament of participants, the tournament having at least one first round including a plurality of games and at lease one second round including a plurality of games.

17 Claims, 8 Drawing Sheets

For 8 teams of a 64 Team Round Two

| Seed Sum | No. of ways Attainable | Seed Sum | No. of ways Attainable |
|---|---|---|---|
| 10 | 1 | 19 | 1 |
| 11 | 1 | 20 | 1 |
| 12 | 0 | 21 | 1 |
| 13 | 1 | 22 | 1 |
| 14 | 1 | 23 | 1 |
| 15 | 1 | 24 | 0 |
| 16 | 1 | 25 | 1 |
| 17 | 1 | 26 | 1 |
| 18 | 2 | | |

FIG. 5

For 16 teams of a 64 Team Round One

| Seed Sum | No. of ways Attainable | Seed Sum | No. of ways Attainable |
|---|---|---|---|
| 36 | 1 | 69 | 7 |
| 37 | 1 | 70 | 7 |
| 38 | 0 | 71 | 7 |
| 39 | 1 | 72 | 8 |
| 40 | 1 | 73 | 7 |
| 41 | 1 | 74 | 6 |
| 42 | 1 | 75 | 7 |
| 43 | 1 | 76 | 7 |
| 44 | 2 | 77 | 6 |
| 45 | 2 | 78 | 5 |
| 46 | 2 | 79 | 6 |
| 47 | 2 | 80 | 5 |
| 48 | 3 | 81 | 5 |
| 49 | 3 | 82 | 4 |
| 50 | 3 | 83 | 4 |
| 51 | 4 | 84 | 5 |
| 52 | 5 | 85 | 4 |
| 53 | 4 | 86 | 3 |
| 54 | 4 | 87 | 3 |
| 55 | 5 | 88 | 3 |
| 56 | 5 | 89 | 2 |
| 57 | 6 | 90 | 2 |
| 58 | 5 | 91 | 2 |
| 59 | 6 | 92 | 2 |
| 60 | 7 | 93 | 1 |
| 61 | 7 | 94 | 1 |
| 62 | 6 | 95 | 1 |
| 63 | 7 | 96 | 1 |
| 64 | 8 | 97 | 1 |
| 65 | 7 | 98 | 0 |
| 66 | 7 | 99 | 1 |
| 67 | 7 | 100 | 1 |
| 68 | 8 | | |

For 8 teams of a 64 Team Round Two

| Seed Sum | No. of ways Attainable | Seed Sum | No. of ways Attainable |
|---|---|---|---|
| 10 | 1 | 19 | 1 |
| 11 | 1 | 20 | 1 |
| 12 | 0 | 21 | 1 |
| 13 | 1 | 22 | 1 |
| 14 | 1 | 23 | 1 |
| 15 | 1 | 24 | 0 |
| 16 | 1 | 25 | 1 |
| 17 | 1 | 26 | 1 |
| 18 | 2 | | |

| Top Three | Top Three Total | Top Three | Top Three Total | Top Three | Top Three Total | Top Three | Top Three Total |
|---|---|---|---|---|---|---|---|
| 123 | 6 | 156 | 12 | 256 | 13 | 456 | 15 |
| 124 | 7 | 157 | 13 | 257 | 14 | 457 | 16 |
| 125 | 8 | 158 | 14 | 258 | 15 | 458 | 17 |
| 126 | 9 | 167 | 14 | 267 | 15 | 467 | 17 |
| 127 | 10 | 168 | 15 | 268 | 16 | 468 | 18 |
| 128 | 11 | 178 | 16 | 278 | 17 | 478 | 19 |
| 134 | 8 | 234 | 9 | 345 | 12 | 567 | 18 |
| 135 | 9 | 235 | 10 | 346 | 13 | 566 | 19 |
| 136 | 10 | 236 | 11 | 347 | 14 | 578 | 20 |
| 137 | 11 | 237 | 12 | 348 | 15 | 678 | 21 |
| 138 | 12 | 238 | 13 | 356 | 14 | | |
| 145 | 10 | 245 | 11 | 357 | 15 | | |
| 146 | 11 | 246 | 12 | 358 | 16 | | |
| 147 | 12 | 247 | 13 | 367 | 16 | | |
| 148 | 13 | 248 | 14 | 368 | 17 | | |

FIG. 10

| Top Three Total | No. of Ways Attainable | Top Three Total | No. of Ways Attainable |
|---|---|---|---|
| 6 | 1 | 14 | 6 |
| 7 | 1 | 15 | 6 |
| 8 | 2 | 16 | 5 |
| 9 | 3 | 17 | 4 |
| 10 | 5 | 18 | 2 |
| 11 | 6 | 19 | 2 |
| 12 | 12 | 20 | 1 |
| 13 | 6 | 21 | 1 |

METHOD FOR DEFINING OUTCOMES OF ENSEMBLES OF GAMES USING A SINGLE NUMBER AND WITHOUT REFERENCE TO INDIVIDUAL GAME WINS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to methods for defining the outcome of seeded tournament games and related endeavors, either in whole or in part, and particularly with respect to methods by which wagers may be placed on tournament or "round" outcomes without having the winner of any particular game become fully determinative of that defined outcome, thereby to preclude the "fixing" of any particular game so that "winning" bets could be made, i.e., within the method of the invention any "fixing" of the outcome is rendered virtually impossible.

2. Description of Related Art

It has been long practice for people who may or may not have any intrinsic interest in sports events nevertheless to engage in betting thereon, whether through clubs, betting parlors, or simple "office pools" or wagers with friends and neighbors and the like. Such wagering may encompass single games, or it may encompass ultimate winners in various rounds or in the entirety of various seeded tournaments, both amateur and professional, such as that of the National College Athletic Association (NCAA) in basketball (16 teams within each of four regions) or the National Football League (NFL) (6 teams in each Conference) However, a campaign further to prohibit betting or gambling in relation to both amateur (including Olympic) and professional sports is being undertaken, because of the tendency for there to occur at least two kinds of dishonest and corrupting practices in connection therewith, which are (a) the use of performance enhancing drugs; and (b) ties to organized crime and the possibility of "fixing" particular games so as to ensure being able to make a "winning" bet. Thus, in the U.S. Congress there has appeared H.R. 3575 ($106^{th}$ Congress, $2^{nd}$ Session), the "Student Athletic Protection Act," which would add to the existing 28 U.S.C. §§ 3701–3704 (Title 28, Ch. 178—Professional And Amateur Sports Protection) a provision that would more explicitly incorporate high school, college and Olympic games within those activities with respect to which gambling would be prohibited, and also adding gambling within States that had permitted such prior to 1991. Also, the NCAA has long waged a campaign to discourage gambling by student athletes, and for that purpose it publishes a brochure entitled "Don't Bet On It" that it posts at the web site http://www.ncaa.org/gambling/dontbetonit/. It is thus of interest to devise means not previously contemplated whereby the sports wagering that will inevitably occur may be isolated from the adverse influences noted, and as background for that purpose some description of tournament structure should be useful.

For purposes of the present invention, a "tournament" is defined as a sequence of two or more separate game plays between paired teams, occurring between at least two such pairs of teams, so as to yield two or more sequential outcomes that will ultimately lead to a winner of the tournament as a whole.

An "elimination tournament" is one in which individual teams or players that start out playing in a tournament are not allowed to proceed further in the tournament after having lost a predetermined number of games, which number is often 1, but may be 2 or more (e.g., as is often done in high school tournaments).

A "non-elimination tournament," typically employed in golf, is one in which no players or teams are eliminated from further play but simply complete the tournament, or may be projected to do so, in an order of ranking based upon comparisons of actual of anticipated scores.

An "event" has the same structure as a non-elimination tournament but occurs all at once as, for example, a horse race or the like, and the horses (or dogs, etc.) are simply ranked in order of their anticipated and then actual order of finishing.

A "round" is one stage of an elimination tournament and is defined as an array of one or more individual games that are typically played either simultaneously or in reasonably near time proximity one to the other in the case of there being more than a single game within the round, in which the pairings of teams so playing against one another has been established by preset rules. Thus, in a "first round," all or nearly all of the teams that will be playing in the tournament will have been "paired off" in some fashion, and then those teams that win their games in that first round will "advance" to the "second round." A team would not have played in that first round if it had received a "bye," by which is meant that based upon some set criteria, such a team will be allowed to play in the second round of the tournament without having had to play (and win) in the first round. (Such a process is mathematically necessary when the number of teams playing in the tournament is not a power of 2, as in the National Football League in which 12 teams compete.) The "final round" of the tournament represents the case in which the round consists of a single game, i.e., for the "championship."

A "bye" is a circumstance relevant to an elimination tournament wherein some even numbers of teams or players are not required to play in a particular round, typically the first round, but proceed to a subsequent round automatically so as to join in that subsequent round with those teams or players that played in the given round and then "advanced" to the subsequent round.

Both individual rounds and tournaments as a whole, and both elimination or non-elimination, are designated herein as constituting an ensemble of games (As noted, an "event" is treated herein in the same manner as a non-elimination tournament.) Similar such ensembles are found, for example, in "day's games," i.e., an array of some particular number of NFL games that would be played on a Sunday, or in some instances in the course of a season there would be fewer games; in others one or more pairs of teams would instead play on some week night to complete a "week's games," and so on, but in any event there will be some defined ensemble of games to which the method of the invention will apply in same manner as it does to a single tournament round.

By "seeding" is meant the process by which a set of rules has been defined whereby the performance of each of the teams within a defined league during the course of a "regular season," i.e., a previously defined game schedule for the year in which all of the teams in the league participate, determines whether or not each particular team will "make the playoffs," i.e., will be permitted to participate in a "post-seasons" tournament for which there will also be defined a specific game schedule, and those teams so selected will then be "ranked" by some set of rules. Each team that "made the playoffs" is then "ranked" or "seeded" so that, in one method of seeding, the team being deemed the "best" in terms of a subjective "likelihood of winning" becomes the first seed, i.e., with a seed of "1," and the remaining teams are then seeded similarly, in ascending order, so that the lowest rated team has the highest seed number. (Seeding might also be done alphabetically, e.g., as "A," "B," etc., but any such method is easily converted into to an equivalent numeric scale wherein, e.g., A=1, B=2, and so on.)

That process might instead depend more objectively on the number and distribution of games actually won and lost during the regular season, or have some other basis such as a "power rating." By this latter process, which is often also subjective, teams may be rated in terms of games won and lost, and also by the "point spread" of the games, i.e., the number of points by which a game was won, but other data may also be considered, such as who is injured, who got traded with whom, the strength or "toughness" of each team's schedule, etc., and the seeding is then derived from that power rating.

In the case of "day's games," as another example, an array of predicted point spreads is typically published that can be used to rank the teams. This process is illustrated in the following Table I, wherein four games (involving teams with fictitious names) are shown to be scheduled for a particular day, and predictions have been made as to which teams will win and by what particular point spread or margin, and based upon those data the indicated seed numbers have been assigned:

TABLE I

| Seed No. | Favored | Point Spread | Underdogs | Seed No. |
|---|---|---|---|---|
| 1 | Eagles | 10 | Hawks | 8 |
| 2 | Pigeons | 8 | Sparrows | 7 |
| 3 | Robins | 6 | Crows | 6 |
| 4 | Doves | 2 | Cardinals | 5 |

The team for which the largest point spread win has been predicted is given the top seed of 1 and its opponent is given the lowest, i.e., 8; the team getting the second highest point spread winning prediction gets the second highest seed, i.e., 2, and its opponent gets the second lowest, i.e., 7. When using this method the sum of those two seeds for the opposing teams in a particular game always totals x+1, where x is the number of teams playing (in this case, 8).

In any event, by means of the preceding examples or by other similar means, some specific set of seeds will have been assigned, and it is to a tournament or to "day's games," "week's games" or the like in which seeds have been assigned, and as to tournaments the "pairings" of the teams as to which team wit first play which other team and so on has been carried out, that the invention is directed. With respect to tournaments, the method of the invention can be applied to successive rounds or to the tournament as a whole, and the complete playing of that tournament will ultimately determine an overall "champion." The method does not apply to such a final tournament game, since that would entail reference to a single, particular game.

It should also be noted that different rules may be applied in establishing which team was in fact the "winner." The casual home or office better may identify that winner in the normal fashion, i.e., the winner was the team that scored the most points. More sophisticated betters may instead take account of point spreads, as noted above, wherein a team projected to "win" will not actually be designated the winner unless it wins by a margin that at least equals the point spread.

To illustrate that process, we postulate a playing of the games indicated above in Table I to yield the following results: Eagles 20—Hawks 15; Pigeons 30—Sparrows 20, Crows 7—Robins 3; and Doves 14—Cardinals 13. By the common method, the winners of these games would of course be the Eagles, Pigeons, Crows and Doves. However, it may be noted that while the Eagles won their game, they did so by less than the projected point spread of 10, and consequently they would be deemed the "losers" in the sense that those who had bet on the Hawks will have won their bet, since the Hawks lost by a score less than the point spread. Similarly, those who had bet on the Cardinals would "win," since the Cardinals lost by only 1 point, which is similarly less than the point spread (2) applicable in that bet.

While the foregoing process was described in terms of the games postulated in Table I, that same process could of course be applied to the playing of a particular round of a tournament as well. Moreover, those of ordinary skill in the art might well devise some other means other than the raw score than the aforesaid "point spread method" by which a "winner" would be determined, and the invention must then be regarded as contemplating all such methods, the method of the invention becoming applicable at the time that some agreed-upon set of "winners," using any such method as previously agreed upon, will have been decided.

Efforts have been made to develop various schemes for evaluating or sometimes mimicking tournament play, such as that of U.S. Pat. No. 4,842,275 issued Jun. 27, 1989, to Tsatskin, which describes a method for structuring tournaments. The structure is such that, contrary to standard practice, the top- and bottom-seeded teams, and thereafter the second from the top seeded and second from the bottom seeded, etc., are in fact not paired off, thereby to make first rounds of such method more competitive. The method is also structured so as to avoid having the two best teams become paired in a first round, whereby one of them would be eliminated from further play. The teams are distributed within particular "zones" made up of several stage groups, subsequent play then to occur between first place finishers in the different zones. Second place finishers, and so on, are identified in a similar manner, and intermediate sub-tournaments may also be involved before there appears a final winner. The method describes an alternative procedure to that commonly in use in the playing of actual games, and does not involve any aspect of predicting winners or defining outcomes other than by the identification (through actual play) of winning teams.

U.S. Pat. No. 5,518,239 issued May 21, 1996, to Johnston, describes a method of playing a lottery game in which winning numbers are selected by the outcome of one or more sporting events such as horse races. Firstly, random numbers are generated to be assigned to individual lottery players in the usual manner. The outcome of the event is then described in terms of a set of numbers, each of which has been assigned to an entrant in the race, from which the numbers of the winning horses as in first, second, and third place finishes define the event outcome. The "winning" by the lottery player is determined by the extent to which the numbers that the player was assigned match up with the numbers so generated by the event. In a variation of the actual number matching process as just described, for a multi-race event such as a three race event, the numbers corresponding to the horses that achieve first, second, and third place finishes in each event are then placed in order into a 3×3 matrix, i.e., across one of the three rows for each race. "Winning" by the lottery player is then determined by the extent to which the numbers that person was assigned match with those winning numbers so as to form matching rows or columns in that matrix. The selection of numbers to be assigned to the lottery players is a random process as previously noted, but the winning numbers that arise from the horse race itself are established immediately upon completion of the event (taking account of appeals or disqualifications and the like), and without further calculation, i.e., the "winning numbers" are established by the identity of the particular horses that achieved first, second and third place finishes in that specific order.

U.S. Pat. No. 5,779,242 issued Jul. 14, 1998, to Kaufmann, describes a format for tournament play of the "double-elimination" type in which the winners and losers of a first round of play are moved respectively into "winners" and "losers" brackets; the players or teams within those brackets continue their play in the usual "single-elimination" manner, some players or teams that were initially in the winners bracket being forced into the losers bracket because of a loss, the winners bracket when reduced to 16 players or teams plays a double elimination sub-tournament, and finally four players or teams of the winners bracket play a single player or team from the losers bracket in a final championship tournament.

U.S. Pat. No. 5,839,725 issued Nov. 24, 1998, to Conway, describes a game board and tournament-style game set up for 32 teams wherein seeding is done by the "drawing" of up to 16 "seeding chips," a remaining set of up to 16 "unseeded" teams then being matched with the seeded teams by the rolling of ordinary die. There are also several types of die provided for use in the actual playing of the game that are so constructed as to have different probabilities of exhibiting higher numbers when rolled. These are rolled in association with corresponding seed positions so that, for example, the top seeded team will indeed tend to have a higher probability of winning. The game is played through the several rounds of the tournament, using other game implements including "REFEREE" and other cards that impose particular steps to which a player is subjected, and thus to reflect or mimic in an entertaining manner the playing of an actual tournament. Other than the indicated seeding and "weighted" die processes, however, the patent does not reflect any aspect of predicting winners or defining the outcomes of the various rounds or of the tournament as a whole other than that normally used in the play of actual tournaments.

Finally, in U.S. Pat. No. 6,092,806 issued Jul. 25, 2000, to Follis, an NCAA basketball tournament prediction game is described that includes (a) a contestant entry form, (b) a scoring system with 100 points available overall to be "earned" by game contestants; (c) data processing means for determining contestant game scores; and (d) means for notification of results to contestants. In the tournament there are 64 teams, resulting in a total of 62 game pairings plus the final championship game, and contestants in the described prediction game are then to pick the winners of those 63 individual games. A disadvantage of this prediction game—which, of course, is easily adaptable to betting purposes—lies in the usual process of "picking the winner" of individual games, which process may come to encompass the adverse influences previously described.

Again with respect to the present invention, in the case of the NCAA, for example, within a particular region the team with the "best" record for the regular season would be ranked or seeded as "No. 1," and the team with the "worst" record would be seeded "No. 16." There being four different regions in the NCAA basketball tournament, the total number of teams becomes 64. FIG. 1 shows an instance of the manner of seeding with respect to two such regions that herein are arbitrarily defined respectively as NW and SW regions, it being assumed that there would be a similar pair of NE and SE regions that would ultimately yield an overall winner that would "face off" against the winner from the indicated NW and SW pair of regions for the final championship. Using such a tournament structure, it has been the practice in both home and office betting, and in more sophisticated gambling environs, to bet on the outcomes of particular games which, as noted above, can have deleterious results on the objective nature of the sport. It would be useful, therefore, to provide a method both of defining "winners" of such a betting practice that would be isolated from the winning of particular games, and also by way of a numerical randomization process to separate entirely the issue of winning games from any kind of betting practice, and it is such a method that comprises the present invention.

BRIEF SUMMARY OF THE INVENTION

The invention provides a method for defining the complete result of the full play of a sports tournament, or of any particular "round" of such a sequential tournament, or similarly in a grouping of "day's games" or "week's games and the like, in terms of a single digital number. That number is derived by a summation, within such a round or grouping, of the seed numbers of the teams that in fact won their games. Since the number so derived is established by the entirety of play within the tournament or within a particular round or grouping, there is no single game that can be determinative of that number. Consequently, unlawful, manipulation of the outcome of any single game, or of any number of games less than the full totality of games played within a round or grouping, would be fruitless as a means for seeking to ensure the placement of any winning bet. The link between tournament play and any kind of unlawful gambling, or the "fixing" of games so as to ensure having a winning bet, is thus essentially severed. The invention also provides a numerical randomization process through which any small vestige of a connection between betting and the winning of particular games can be eliminated entirely.

BRIEF DESCRIPTION OF THE DRAWINGS

FIG. 5 shows the range of possible seed sums for the first round of the tournament of FIG. 1, together with the number of different ways in which each particular seed sum can be achieved.

FIG. 10 shows the number of ways in which each of the different "top three totals" of FIG. 9 could be attained.

DETAILED DESCRIPTION OF THE INVENTION

The method of the present invention is found in a calculation of the sum of the seed numbers within particular rounds of a tournament, or similarly as to "day's games" or "week's games. In its simplest terms, the method of the invention comprises identifying that "sum of the winning seeds," hereinafter termed "seed sum," as to each round of the tournament except the final "Championship Game," and of course similarly as to the groupings found in "day's games" or "week's games" or any other like event. Thus, in FIG. 2 it has been assumed that the seeding was carried out "correctly," i.e., as to each game, the "higher seeded" team—the one actually having the lower seed number—won. It can be seen that the seed sum is 1+8+5+4+3+6+7+2=36. Since the higher seeded team that is anticipated to win will always have the lower seed number, it is evident that the number 36, derived from the case in which the "top seeded" team wins in every game, is the lowest value that such a sum can be found to have using the particular structure of round 1 of FIG. 1.

Figure 3:
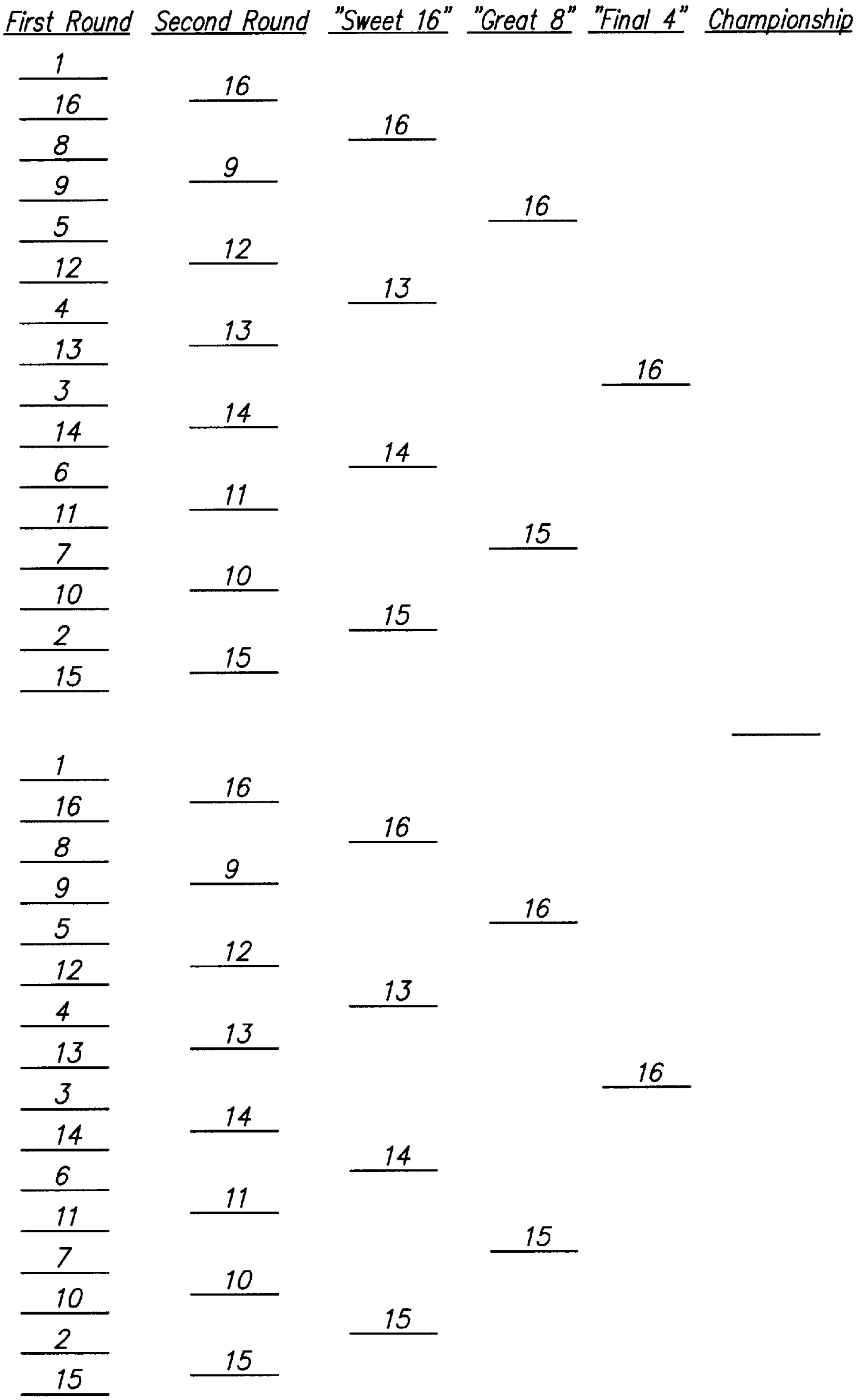
FIG. 3 (PRIOR ART)
FIG. 3 shows a similarly hypothetical but much less likely outcome from FIG. 1 wherein all of the higher seeded teams are presumed in every round to have lost their games.

Similarly, in FIG. 3 is shown an (extremely unlikely) alternative outcome in which all of the lower seeded teams (having the higher seed numbers) won their games. Here the seed sum of the first round is 16+9+12+13+14+11+10+15=100, which is the highest value that the seed sum can have using the structure of round 1 of FIG. 1. In other possible outcomes, the seed sum will have values falling between 36 and 100, and it is in selecting that seed sum beforehand for betting purposes, or in adding up the seed numbers of the teams that actually won so as to define the outcome of a particular round or of the tournament as a whole, that one aspect of the method of the invention is practiced.

Figure 1:
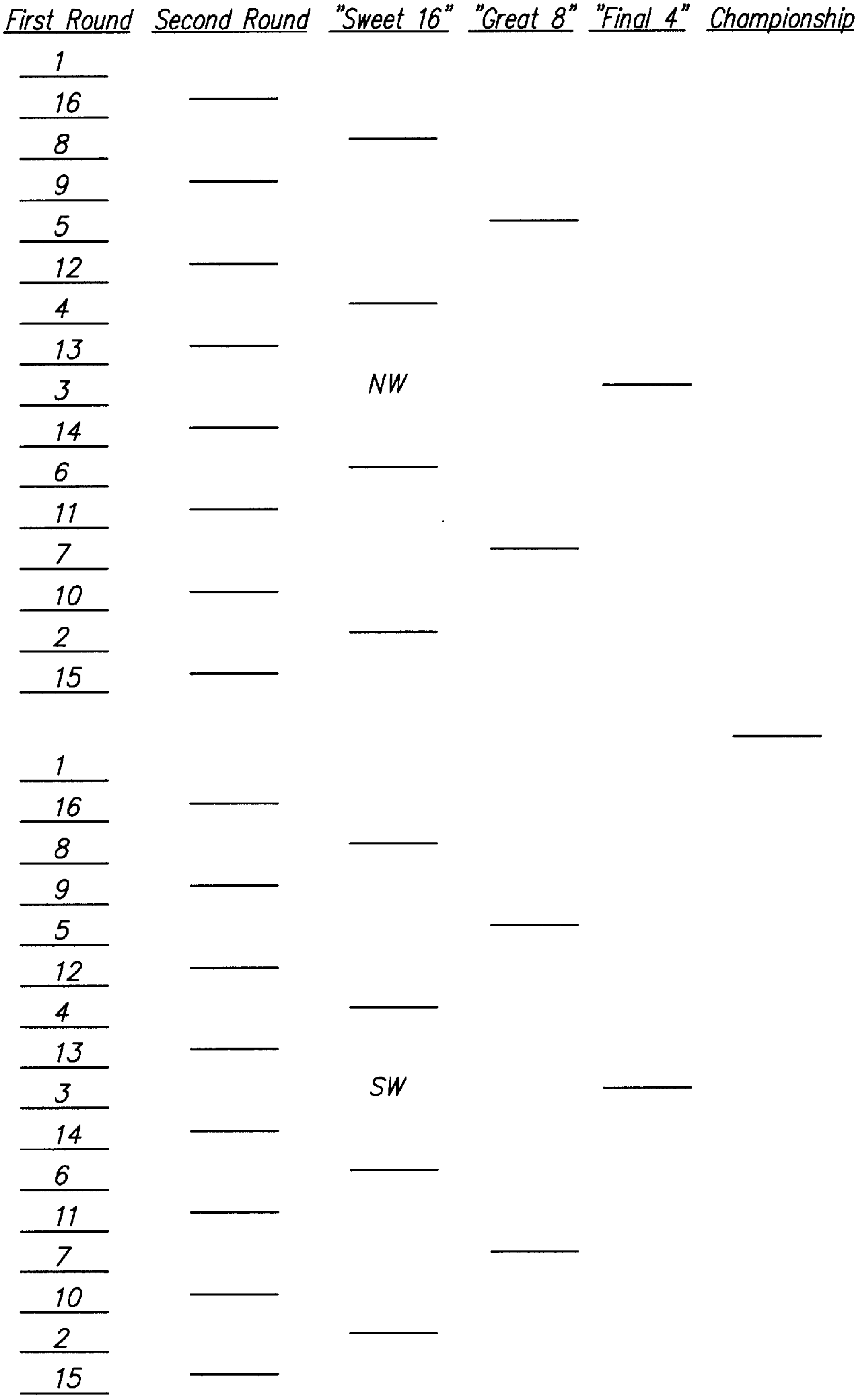
FIG. 1 (PRIOR ART)
FIG. 1 shows from the prior art the manner of structuring tournament play among an array of 32 teams that would comprise one half of an NCAA tournament.
Figure 4:
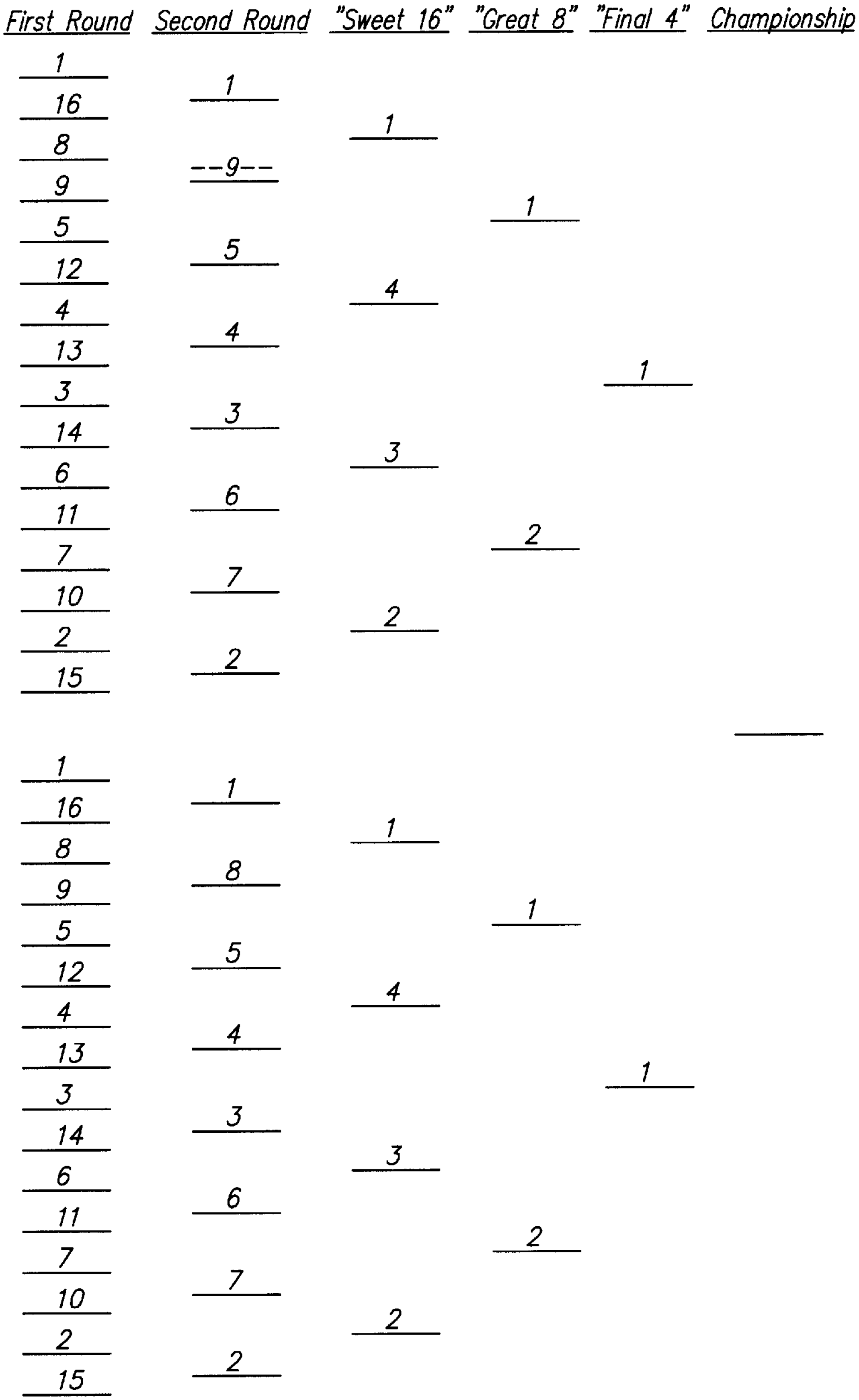
FIG. 4 (PRIOR ART)
FIG. 4 shows a hypothetical outcome of play similar to that of FIG. 2, except that in one instance there was an "upset," i.e., the $9^{th}$ seeded team beat the $8^{th}$ seeded team.

In some cases, a particular seed sum may be achieved by different groupings of winning teams, while in others only one possible grouping will suffice, or indeed the seed sum in question cannot occur at all. For example, another possible outcome of the tournament of FIG. 1 is shown in FIG. 4, wherein as to the second pairing down in the column for the first round, i.e., that between the $8^{th}$ and $9^{th}$ seeds, it is shown in column 2 (marked by dashes) that it was the $9^{th}$ rather than the $8^{th}$ seeded team that won, i.e., there was an "upset." The sum of the "winning seeds," or seed sum, in this case becomes 1+9+5+4+3+6+7+2=37. Analysis of FIGS. 1 or 4 shows that in this particular instance, the result indicated in FIG. 4 is the only way in which the seed sum could become 37, since it is only in the case of paired teams seeded as 8 and 9 that their seed numbers differ just by 1. Similarly, since there are no matched pairs of teams that have seed numbers that differ by 2, wherein the resultant seed sum would be 2 greater in an "upset" instead of having the top-seeded team win so as to yield a seed sum of 38, cannot occur.

At the same time, the only way in we the seed sum can indeed become 37 is that in all of the other games, the "top-seeded" teams win. The game between the teams with the seeds 8 and 9 is thus not in itself determinative of what the resultant seed sum will be, i.e., that the $9^{th}$ seeded team beats the $8^{th}$ seeded team is a necessary condition to achieve a seed sum of 37, but it s not a sufficient condition. Therefore, the game between the "8" and "9" teams is no more determinative of what the seed sum will be than are any of the other games in the round or group. Turning again to FIG. 1, the range of possible outcomes of first round play that might be entered thereon, i.e., the seed sums from all of the various possible results of such play, are shown in FIG. 5, together with the numbers of ways in which each such seed sum can be achieved.

Figure 2:
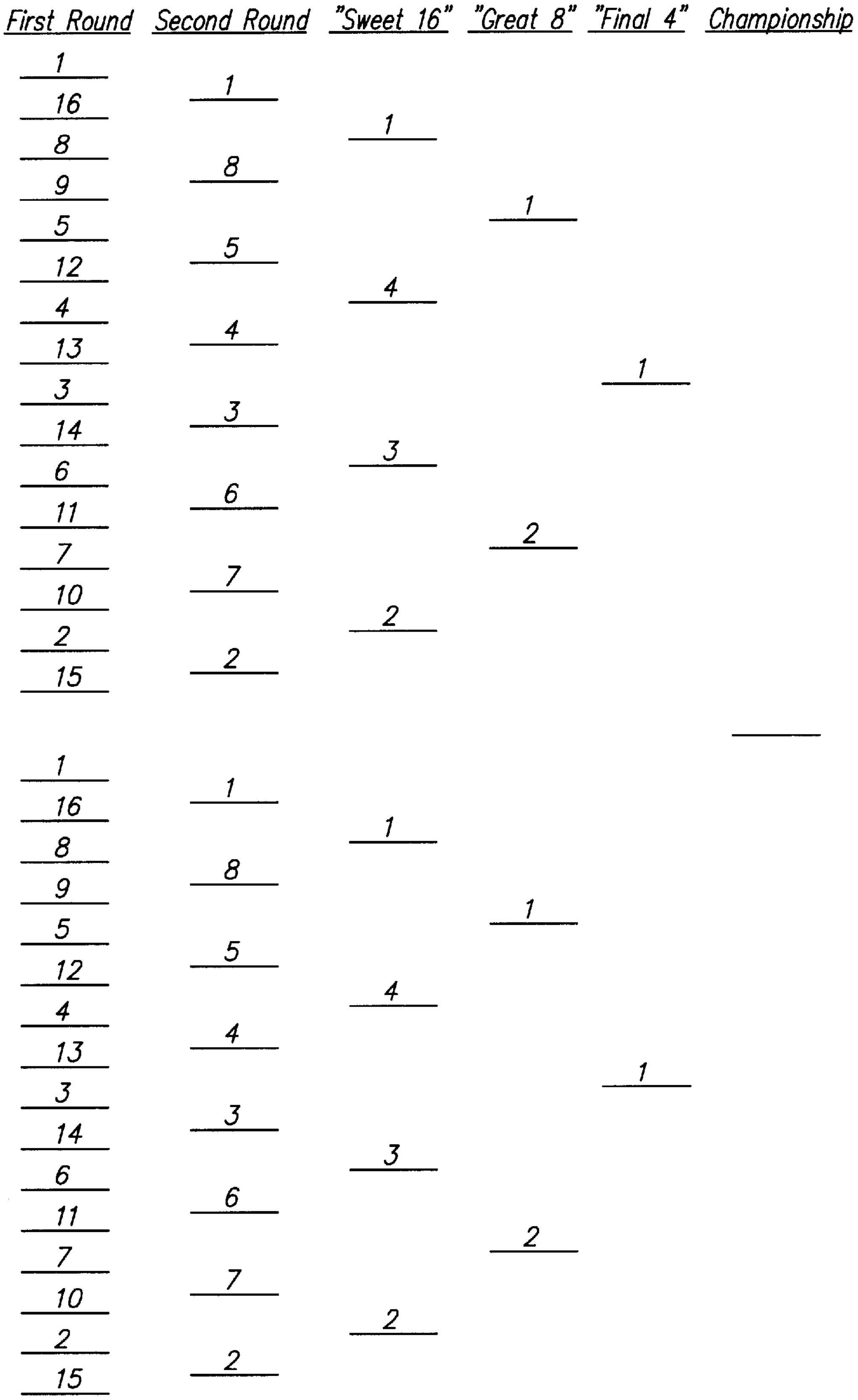
FIG. 2 (PRIOR ART)
FIG. 2 shows a hypothetical outcome of play deriving from FIG. 1 wherein all of the higher seeded teams are presumed in every round to have won their games.
Figures 6, 7:
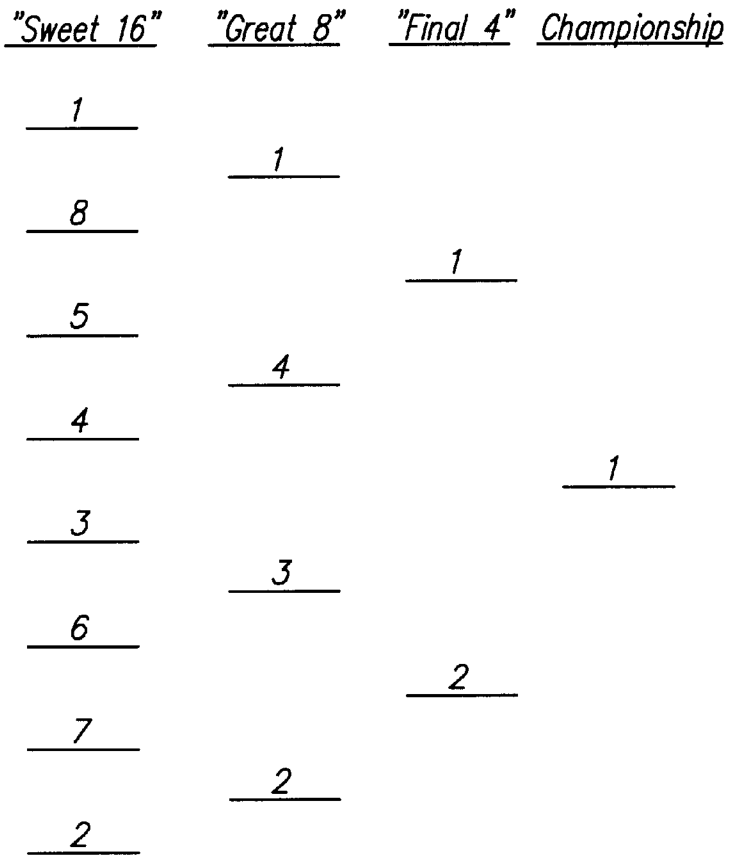
FIG. 6 (PRIOR ART)
FIG. 6 shows the range of possible seed sums for the second round of the tournament in which all of the top seeds won their games as indicated in FIG. 2.
FIG. 7 shows the possible seed sums and number of ways in which each could be achieved in the case of 8 teams playing in a 64-team round two.

Similar circumstances apply to the outcomes of round 2 shown in column 3 of FIG. 2. The seed sum is given by 1+4+3+2=10, as shown in FIG. 6 in the case that all of the top seeded teams are presumed to have won. Then allowing "upsets" in this second round structure, a seed sum of 11 could again be achieved in only one way, i.e., the $5^{th}$ seeded team beats the $4^{th}$ seeded team (not shown). In this case there is no way to achieve a seed sum of 12, and just one way to achieve a seed sum of 13, i.e., the $6^{th}$ seeded team beats the $3^{rd}$ seeded team, and so on. In each of these cases, to achieve the indicated seed sum again depends not just on any particular game, but rather on the outcomes of all of the other games in the round as well.

It should be noted again that the seed numbers for the second round as shown in FIG. 6 apply only in the case illustrated in FIG. 2, namely, that all of the top seeded teams won their games. It should be clear from FIG. 3 in which it was assumed that all of the bottom-seeded teams won their games, or also from FIG. 4 in which there was the "upset" of the $9^{th}$ seeded team beating the $8^{th}$ seeded team, that other outcomes of first round play would yield a different set of seed numbers as to round 2. The previous remarks concerning the seed sums that could arise from round 2 play when all of the top-seeded teams of the first round won their games would not then apply in the precise terms stated. Other calculations, but in the same manner as was illustrated above, would have to be made to determine what were the possible seed sums that could arise in those circumstances.

In general, where x=the total number of teams in a particular round or other such ensemble in which the seed numbers form a continuous sequence having increments of 1 therebetween, formulae can be written for the quantities y=lowest possible seed sum, z=highest possible seed sum, and t=range of possible seed sums, as follows:

$$y=(x/2+1)(x/4);$$

$$z=(x+x/2+1)(x/4);$$

and $$t=z-y+1.$$

Thus, for the 16-team first round of FIG. 1, as previously noted y=36 and z=100, and also t=65. As to the 8 team round of round 2 of the tournament of FIG. 2 just described, y=10, z=26, and t=17. The numbers of possible ways in which each of these seed sums can be achieved in this latter case are shown in FIG. 7. The corresponding numbers for a 32 team round the number of different ways in which various seed sums can be achieved get rather large: for this case, y=136; z=392; t=257; and by "brute force" calculation as can be programmed into a computer by a person of ordinary skill in the art, for all of the combinations of winning seeds the maximum number of ways in which a seed sum can be achieved occurs at the midpoint of range t. Thus, in this 32 team case that maximum turns out to be 692 different ways of the seed sum of 264. (In all cases, the distribution as a whole is symmetric over t about that center and has the appearance of a "bell curve" that asymptotically approaches the minima at y and z.)

It should not be supposed from the foregoing that in selecting ("picking") a seed sum for amusement or for betting purposes, one would simply "follow the probabilities" (i.e., pick a number that has a large number of different ways to be realized) as in a process determined entirely by random distribution. The most likely seed sums from a round or tournament are in fact not randomly distributed, but are a measure of how skillfully the seeding process was carried out. In the 16 team structure described with respect to FIG. 1, if the seeding had been done perfectly the seed sum would be 36 as shown in FIG. 2, and is not very likely to come out very much higher than that if those doing the seeding were at all skillful. Each resultant seed sum higher than 36 means that those who did the seeding would to that extent have failed in their ranking of the teams (or, of course, some unfortunate event occurred with respect to one or more teams that took away from its playing ability, and so on), and there would occur one or more "upsets." To pick a seed sum simply on the mathematical probabilities derivable from FIG. 5, i.e., seed sums that in the mid-range have up to 8 different ways of being realized, would at the same time mean that those who did the seeding would have been quite wrong in something like half of the seeding process, which would be quite unlikely. For there to occur the seed sums shown in FIG. 3, in which all of the lower-seeded teams would have won their games, would of course be virtually impossible. That the picking of a seed sum is not an easy task, along with the fact that no single game or even small number of games can determine what that seed sum will be, contributes to the value of the present invention in providing means for wagering on tournaments or tournament rounds or the like that cannot reasonably be perverted by dishonest practices.

Additional difficulty, and indeed a tendency towards randomness, is realized when the winning teams are designated taking into account the point spread discussed above with respect to Table I. For example, while it may be quite unlikely that the top-seeded team will in fact lose its game, it may be entirely likely that it might win the game but by a margin less than the point spread, and for that reason be declared a "loser." Use of the point spread in defining which team "wins" thus tends to spread the likely seed sums into higher values.

Figures 8, 9:
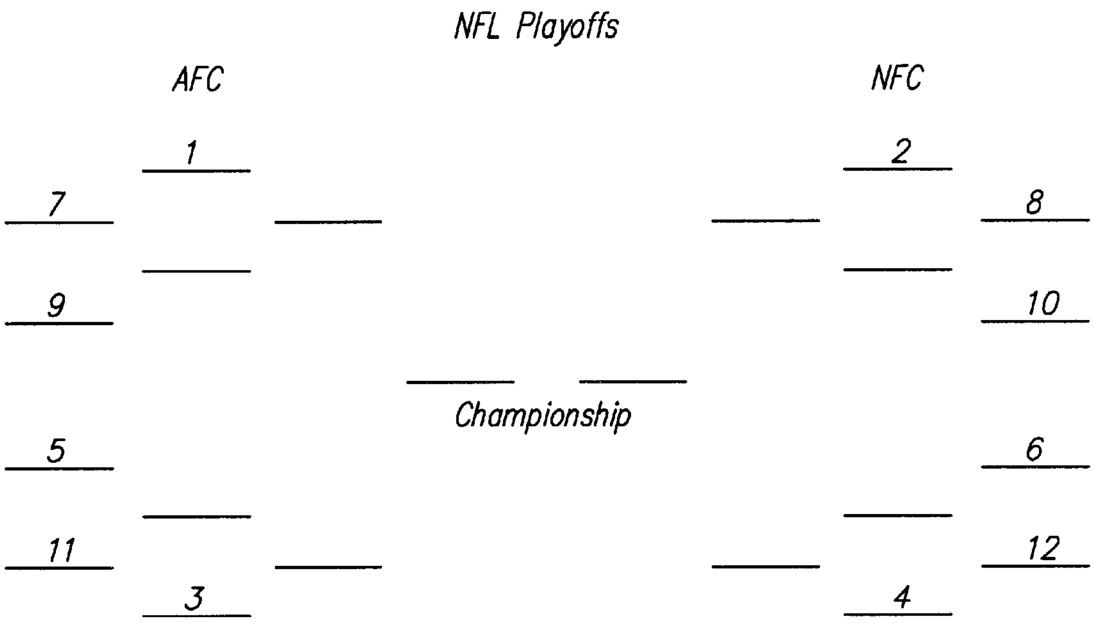
FIG. 8 shows a game structure and one assigned seeding of the participants of the NFL playoffs for practicing a method of the invention.
FIG. 9 shows the possible "top three totals" in a win-place-show race finish having eight entries.

Another tournament structure in which the picking of seed sums becomes substantially easier, but is yet within the scope of the invention, is found in the "bye" tournament, in which selected high-seed teams or players enter the second round with out having had to play (and win) in the first round, a well known example of which is the National Football League (NFL) playoffs shown in FIG. 8 for both the AFC and the NFC. In such a bye tournament, some even number of teams, which in the case of the NFL will be two pairs, are not required to play in the first round, and these will ordinarily be the top four seeds. The possible resultant seed sums for the first round are thus few; i.e., the lowest possible seed sum for the AFC is 1+3+7+5=16 (wherein the 1 and 3 teams are the "by" teams), and the highest possible seed sum is 1+3+9+11=24, with the only other two possibilities being 1+3+9+5=18 and 1+3+7+11=22, wherein each of these four possible seed sums can each be achieved in just a single way. Similarly as to the NFC, the lowest possible seed sum is 2+4+8+6=20 and the highest is 2+4+10+12=28, with other possible values being 2+4+10+6=22 and 2+4+8+12=26, each again achievable in only one way. The NFL playoffs thus have a structure in which the chances of picking the seed sum that actually occurs, whether as to the first round results for both conferences (in which, for example, there would be two occurrences of the seed sum 22) or separately, are rather greater than making such a pick for an NCAA tournament. In playing the second round of the NFL playoffs, with the addition of the teams that had a bye there will again be four teams playing in each conference and, as in the case of the first round, establishing what are the possible seed sums is straightforward and is carried out in the same manner as just shown with respect to the first round.

Quite another type of tournament structure is found in the non-elimination tournament such as golf in which the players or teams continue play to the end of the tournament and then end up, or may be projected to end up, in an order of ranking based upon comparisons of actual or anticipated scores. The same structure applies to horse and dog races, and indeed to any other kinds of races or games (e.g., track and field events) at the end of which all of the players or teams will have ended up ranked in some order based upon their achievements. The entries in such events are not actually "seeded" as they are in the previous examples, but nevertheless they are often given rankings of expected finishes, and of course the actual results may likewise be described in such an order of finishing.

To use horse and dog races as an example of this kind of event, in betting it is common to pick the top three finishers, i.e., the "win," "place," and "show" positions. FIG. 9 shows the distribution of possible outcomes of an eight-entry horse or dog race or the like in which the sum of the "ranking numbers" of the top three finishers are indicated. The order of finish within the top three were of course not considered, since that would involve picking individual winners which lies outside of the scope of the invention. (It is this specific feature which distinguishes the present invention from Johnston, since in the present invention there is more than one way to realize a winning set of numbers, e.g., an order 3, 8, 6 is equivalent to an order 8, 6, 3 and so on.) From FIG. 9, the number of ways in which any particular possible "top three total" could be realized is easily ascertainable, and is shown in FIG. 10. The same procedure may of course be applied to golf tournaments or other events, whether taking place all at once or over a course of days, and for any predetermined number of players or teams, of course using numbers appropriate for the number of players or teams involved in the particular event.

The same method can be applied to tournaments or events in which there occurs no seeding or ranking at all, or if such does occur, the method of the present invention is instead applied relative to some other means for indicating the identity of particular teams or players. For example, the horses in a race will each bear numbers that have been more or less arbitrarily assigned, e.g., 16, 13, 18, 22, 12, and so on. From those numbers, one can derive what may be designated as a "result number," and in this case the "result number" would be the summation of the identification numbers of the three horses that had finished in the first, second and third places, or for betting purposes in advance that same sum for those horses that one expected or hoped would so finish. Other applications of the method will also be obvious to a person of ordinary skill in the art, such as to the top three scorers in a basketball game, the players likewise being identified by particular, arbitrary numbers.

Moreover, a specific element of randomness, for such purposes as a lottery, can also be introduced into the method.

For example, commencing with a set of seed numbers for a region as shown in FIG. 2, a corresponding set of 16 random numbers can be generated and assigned to the existing seed numbers in an equally random manner. The "result number" of the invention would then be the sum of that set of random numbers that corresponded to the respective seed numbers of the teams that won their first round games and thus advanced to the second round. The further development of the method could involve either publishing the seed number-random number correlation prior to the event, or maintaining that information secret until after the event. In the former case, those knowledgeable of how the method was being applied would have an advantage, since they could identify the particular random number that corresponded to that set of teams comprising the ensemble that they would have selected without such randomization, and then select their anticipated "result number" accordingly.

The gist of the invention, in other words, is that one selects a minimum number of teams or players, preferably at least four, from which to calculate, through summation or any other defined mathematical process, a number based on seeding or any other such means such as those described, wherein that number will by itself unambiguously define the outcome of a tournament, a round of a tournament, a race, a predetermined series of games, and other like-definable events. Some of such "ensembles" of games or events will have standard numbers of teams or players, e.g., as in the rounds of an NCAA or NFL tournament, while in golf tournaments or races the numbers of players, teams or racers may vary, and the mathematical analysis must be adjusted accordingly by means that can easily be deduced from the foregoing description by a person of ordinary skill in the art. In each case, however, the defining number of the method comprising the invention must be generated so as not to depend upon the outcome of any single game, but rather upon the accumulated outcomes of an entire ensemble of games, and similar criteria would apply to horse races and other events.

The invention having thus been shown and described, it will be understood by those of ordinary skill in the art that other features of the aforesaid method, the descriptions of which are intended to be illustrative only and not limiting, may be made without departing from the spirit and scope of the invention, which must be identified and determined only from the following claims and equivalents thereof.

I claim:

1. A method of playing a main game in which the outcome of the main game is represented by a single value, the single value comprising a sum of individual values assigned to a plurality of participants participating in a plurality of individual games, each individual game involving two of said participants and said game having an outcome of a single winning participant and a single losing participant comprising:

- assigning a seed value to each participant of said plurality of individual games, said assigned seed value being unique to each participant and remaining constant throughout said plurality of individual games;
- generating all possible single values achieved by summing said assigned seed value of said participants based upon all possible winning outcomes of said plurality of individual games;
- permitting players to select at least one of said possible single values; and
- determining a single actual outcome value comprising the sum of said assigned seed values of the winning participants of each of said plurality of individual games.

2. The method in accordance with claim 1 including comparing said single outcome value to said possible single value selected by said players to determine the one or more winners of said main game.

3. The method in accordance with claim 1 wherein said participants comprise teams paired in individual games of a tournament.

4. The method in accordance with claim 1 wherein said participants comprise a plurality of entrants in a tournament of individual games arranged to decide at least one winning entrant from said plurality of entrants.

5. The method in accordance with claim 1 wherein said plurality of individual games comprise the individual games of a single elimination tournament involving the participants and said possible single values fall between the value $y=(x/_2+1)(x/_4)$ and $z=(x+x/_2+1)(x/_4)$, where x is the number of participants and said participants are assigned sequential seed values incremented by 1.

6. The method in accordance with claim 1 wherein said seed values comprise sequential numerical values.

7. A betting event in which a player attempts to select a single value representing a outcome of a plurality of individual games involving a plurality of participants, two of said plurality of participants participating in each individual game and each individual game having an outcome comprising a single winning participant and a single losing participant, comprising:

- assigning a seed value to each of said participants, said seed value for each participant being a unique value;
- identifying, using predetermined criteria, the outcomes of said plurality of individual games after said individual games have occurred, said outcomes including the identification of particular winning participants associated with each individual game;
- determining the seed value of said plurality of winning participants identified; and
- calculating a single value representing the outcome of said plurality of individual games by summing said seed values of the winning participants identified.

8. The betting event in accordance with claim 7 wherein said seed values are sequential values.

9. The betting event in accordance with claim 7 wherein said at least two or more individual games comprises a tournament including at least a first round and second round of individual games.

10. The betting event in accordance with claim 9 wherein said predetermined criteria comprises identifying the winner of each pair of participants in an individual game including a point spread assigned to the participants of the individual game.

11. The betting game in accordance with claim 7 including the step of determining the possible single values achievable based upon the possible outcomes of said plurality of individual games.

12. The betting event in accordance with claim 11 including accepting bets on single values from said set of possible single values by one or more bettors.

13. A method of betting on the outcome of a tournament involving a plurality of participants, said tournament having a first round with at least two or more games and at least a second round with at least two or more games, each game involving two of said plurality of participants and the outcome of which defines a single winning participant, which individual games and rounds result in a single winner of said tournament comprising:

- assigning a seed value to each of said participants of said tournament, said seed value remaining constant throughout said tournament;

determining the winner of each two or more individual games of said first round and each two or more individual games of said at least second round; and summing said seed values assigned to the winning participant of each two or more individual games of each of said rounds to generate a single value representing the outcome of said tournament.

14. The method in accordance with claim 13 wherein all of said participants participate in at least one game in said first round and only the winners of said games of said first round participate in said games of said second round.

15. The method in accordance with claim 13 wherein said participants are assigned sequential seed values incremented by the value 1.

16. The method in accordance with claim 15 wherein said single value falls between the values y and z, where $y=(x/_2+1)(x/_4)$ and highest value $z=(x+x/_2+1)(x/_4)$, where x is the number of participants.

17. The method in accordance with claim 13 including the step of comparing values selected by one or more bettors to said single value and declaring as a winner of said plurality of individual games of the one or more bettors who selected said single value.

* * * * *

UNITED STATES PATENT AND TRADEMARK OFFICE
CERTIFICATE OF CORRECTION

PATENT NO. : 6,443,838 B1
DATED : September 3, 2002
INVENTOR(S) : Scott Jaimet

It is certified that error appears in the above-identified patent and that said Letters Patent is hereby corrected as shown below:

Title page,
Item [57], ABSTRACT,
Last sentence of paragraph, “In one embodiment, the method is applied to a tournament of participants, the tournament having at least one first round including a plurality of games and at lease one second round including a plurality of games.” is corrected to read -- In one embodiment, the method is applied to a tournament of participants, the tournament having at least one first round including a plurality of games and at least one second round including a plurality of games. --

Column 1,
Line 39, “Conference) However” is corrected to read -- “Conference). However --

Column 3,
Line 3, “”post-seasons” tournament” is corrected to read -- “post-season” tournament --
Line 59, “as to which team wit first play” is corrected to read -- as to which team will first play --

Column 6,
Line 29, “or “week’s games” is corrected to read -- or “week’s games” --

Column 8,
Line 4, “but it s not a” is corrected to read -- but it is not a --

Column 9,
Line 2, “of the seed sum” is corrected to read -- of achieving the seed sum --
Line 53, “round with out having” is corrected to read -- round without having --
Line 62, “1 and 3 teams are the “by” teams)” is corrected to read -- 1 and 3 teams are the “bye” teams) --

UNITED STATES PATENT AND TRADEMARK OFFICE

CERTIFICATE OF CORRECTION

PATENT NO. : 6,443,838 B1
DATED : September 3, 2002
INVENTOR(S) : Scott Jaimet

It is certified that error appears in the above-identified patent and that said Letters Patent is hereby corrected as shown below:

Column 12,
Line 14, "between the value" is corrected to read -- between the values --
Line 21, "representing a outcome" is corrected to read -- representing an outcome --

Signed and Sealed this

Twenty-eighth Day of January, 2003

JAMES E. ROGAN
*Director of the United States Patent and Trademark Office*